United States Patent
Coden et al.

(10) Patent No.: US 10,733,286 B2
(45) Date of Patent: *Aug. 4, 2020

(54) COMPOSITE PROPENSITY PROFILE DETECTOR

(71) Applicant: International Business Machines Corporation, Armonk, NY (US)

(72) Inventors: Anni R. Coden, Bronx, NY (US); Keith C. Houck, Rye, NY (US); Ching-Yung Lin, Forest Hills, NY (US); Wanyi Lin, Yorktown Heights, NY (US); Peter K. Malkin, Yorktown Heights, NY (US); Shimei Pan, Clarksville, MD (US); Youngja Park, Princeton, NJ (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

This patent is subject to a terminal disclaimer.

(21) Appl. No.: 15/042,651

(22) Filed: Feb. 12, 2016

(65) Prior Publication Data
US 2016/0180082 A1  Jun. 23, 2016

Related U.S. Application Data

(63) Continuation of application No. 13/971,402, filed on Aug. 20, 2013, now Pat. No. 9,311,467.

(51) Int. Cl.
*G06F 21/55* (2013.01)
*H04L 29/06* (2006.01)
(Continued)

(52) U.S. Cl.
CPC .............. *G06F 21/55* (2013.01); *G06F 21/32* (2013.01); *H04L 63/1433* (2013.01); *G06N 5/04* (2013.01);
(Continued)

(58) Field of Classification Search
CPC ..... G06F 21/55; G06F 21/32; H04L 63/1433; H04L 63/102; G06N 20/00; G06N 7/04; G06N 5/048; G06N 5/04; G06N 7/005
(Continued)

(56) References Cited

U.S. PATENT DOCUMENTS

| 6,529,864 B1 | 3/2003 | Chase |
| 7,058,566 B2 | 6/2006 | Shaw |

(Continued)

OTHER PUBLICATIONS

Artifacts as Instant Messenger Buddies Greenberg et al. (Year: 2010).*

(Continued)

*Primary Examiner* — Kakali Chaki
*Assistant Examiner* — Ababacar Seck
(74) *Attorney, Agent, or Firm* — Scully, Scott, Murphy & Presser, P.C.; Anthony R. Curro

(57) ABSTRACT

Detecting propensity profile for a person may comprise receiving artifacts associated with the person; detecting profile characteristics for the person based on the artifacts; receiving a plurality of predefined profiles comprising a plurality of characteristics and relationships between the characteristics over time, each of the plurality of predefined profiles specifying an indication of propensity; matching the profile characteristics for the person with one or more of the plurality of predefined profiles; and outputting one or more propensity indicators based on the matching, the propensity indicators comprising at least an expressed strength of a given propensity in the person at a given time.

17 Claims, 4 Drawing Sheets

(51) Int. Cl.
*G06F 21/32* (2013.01)
*G06N 7/04* (2006.01)
*G06N 7/00* (2006.01)
*G06N 5/04* (2006.01)
*G06N 20/00* (2019.01)

(52) U.S. Cl.
CPC .............. *G06N 5/048* (2013.01); *G06N 7/005* (2013.01); *G06N 7/04* (2013.01); *G06N 20/00* (2019.01); *H04L 63/102* (2013.01)

(58) Field of Classification Search
USPC .......................................................... 706/52
See application file for complete search history.

(56) References Cited

U.S. PATENT DOCUMENTS

| | | | |
|---|---|---|---|
| 8,041,344 B1 | 10/2011 | Coughlan et al. | |
| 8,285,257 B2 | 10/2012 | Isobe et al. | |
| 8,386,377 B1* | 2/2013 | Xiong | G06Q 20/04 455/550.1 |
| 8,583,674 B2* | 11/2013 | Zheleva | G06F 16/437 707/767 |
| 2004/0024694 A1* | 2/2004 | Lawrence | G06Q 20/10 705/38 |
| 2005/0125216 A1* | 6/2005 | Chitrapura | G06F 17/2785 704/1 |
| 2008/0096532 A1 | 4/2008 | Lyle et al. | |
| 2011/0270779 A1* | 11/2011 | Showalter | G06Q 40/02 705/36 R |

OTHER PUBLICATIONS

A Fuzzy Logic Systemfor Seizure Onset Detection in Intracranial EEG Rabbi et al. (Year: 2012).*
Opinion mining with the SentWordNet lexical resource Bruno Ohana (Year: 2009).*
Greenberg, et al., "Artifacts as instant messenger buddies" Report 20008-896-09, Department of Computer Science, University of Calgary, Calgary, Alberta, Canada, 2008, pp. 1-5.
Rabbi, et al., "A fuzzy logic system for seizure onset detection in intracranial EEG", Computational Intelligence and Neuroscience, vol. 2012, Nov. 4, 2011, pp. 1-12.
Ohana, B., "Opinion Mining with the SentWordNet lexical resource" Dublin Institute of Technology, Dissertations, Paper 25, Mar. 1, 2009, 209 pages.

* cited by examiner

10,733,286 B2

COMPOSITE PROPENSITY PROFILE DETECTOR

STATEMENT REGARDING FEDERALLY SPONSORED RESEARCH OR DEVELOPMENT

This invention was made with Government support under Contract No.: W911NF-11-C-0200 (Defense Advanced Research Projects Agency (DARPA)). The Government has certain rights in this invention.

FIELD

The present application relates generally to computers, information systems and cyber security, and more particularly to detecting a propensity profile of a person from electronic communications and other artifacts, and also to matching the detected propensity profile to a set of given propensity profiles.

BACKGROUND

An aspect of cyber security is the detection of insider threats in an organization, such as insiders leaking confidential information, sabotaging critical systems, or causing other undesirable acts in the workplace. Threats from users who have, or have had, legitimate access to a system pose a great risk to commercial and governmental organizations.

Malicious acts are often coupled with changes in the state-of-mind of the perpetrator and/or stressful situations the perpetrator experiences. Stressful situations maybe caused by financial problem or major life events. In many cases, state-of-mind includes experiencing negative state-of-mind such as disgruntlement and dissatisfaction. The ability to detect the state-of-mind of individuals may be effective in the detection and prevention of malicious actions.

BRIEF SUMMARY

A method for detecting propensity profile of a person, in one aspect, may comprise receiving artifacts associated with the person. The method may also comprise inferring profile characteristics for the person based on the artifacts. The method may further comprise receiving a plurality of predefined profiles comprising a plurality of characteristics and relationships between the characteristics over time. At least some of the characteristics may have time varying interdependencies among one another. Each of the plurality of predefined profiles may specify an indication of propensity. The method may also comprise matching the profile characteristics for the person with one or more of the plurality of predefined profiles. The method may further comprise outputting one or more propensity indicators based on the matching. The propensity indicators may comprise at least an expressed strength of a given propensity in the person at a given time.

A system for detecting propensity profile for a person, in one aspect, may comprise one or more profile characteristic detectors operable to execute on a processor, and further operable to detect profile characteristics for the person based on a plurality of received artifacts. A profile matcher may be operable to execute on the processor, and further operable to match the profile characteristics for the person with one or more of a plurality of predefined profiles. The plurality of predefined profiles may comprise a plurality of characteristics and relationships between the characteristics over time. At least some of the characteristics may have time varying interdependencies among one another. Each of the plurality of predefined profiles may specify an indication of propensity. The profile matcher may be further operable to output one or more propensity indicators based on the matching. The propensity indicators may comprise at least an expressed strength of a given propensity in the person at a given time.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a composite propensity profile of a person may be constructed from a given set of artifacts, e.g., email, chat, audio message, and the like, associated with the person. Given a set of longitudinal artifacts (e.g., email, chat, audio message over time), the longitudinal changes (changes over time) of the composite profile of a person may be determined. A profile comprises a set of time varying interdependent characteristics and their associated strength of a person prone to some action(s). For example, there may be a composite profile for an overachiever. There may be a composite profile for other characteristics. Examples of time-dependent characteristics may include personality, emotional state, level of knowledge or experience and activities.

In one aspect, a predefined composite propensity profile may be obtained. For instance, there may be such profile of an overachiever. Static or longitudinal artifacts (e.g., email data, instant messaging data, speech, structured data) associated with a person whose propensity profile is being detected, may be collected. From those artifacts, expressed strength or deviation of strength of propensity characteristics may be automatically detected. Automatic detection may involve use of the collection of terms, rules, models, and natural language processing. The subjects of expressed propensity characteristics and data/time of the expression may be automatically detected. In addition, an alert may be generated if the detected expressed propensity characteristics match the predefined composite propensity profile.

Figure 1:
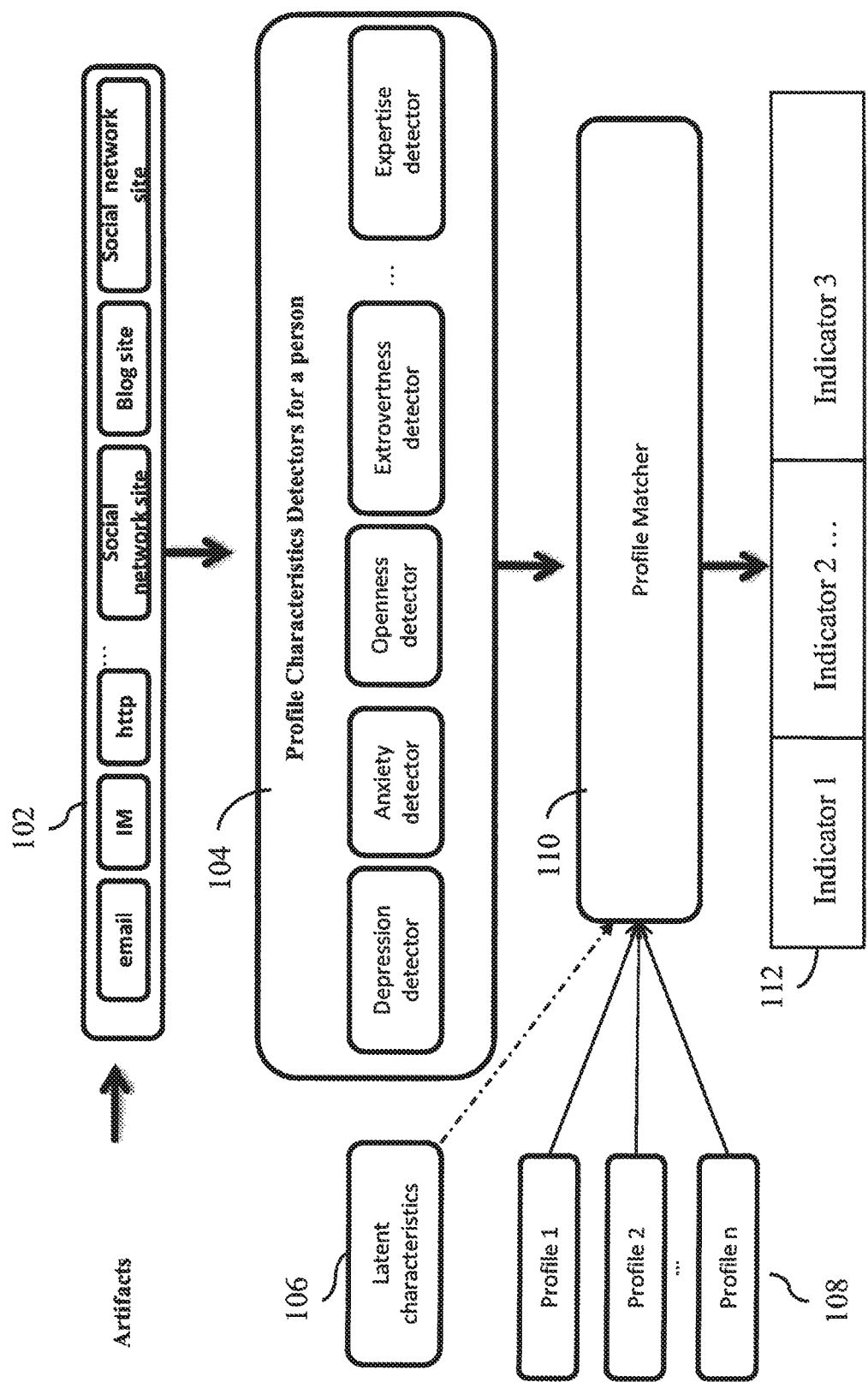
FIG. 1 is a block diagram illustrating components for composite propensity profile detection in one embodiment of the present disclosure.

FIG. 1 is a block diagram illustrating components for composite propensity profile detection in one embodiment of the present disclosure. Artifacts 102 such as email content or data, instant messaging content or data, one's web site content or data, content from social media sites (e.g., social networking, blogging, micro blogging) may be collected. Those artifacts, for example, are associated with a person whose composite propensity profile is being detected.

One or more profile characteristics detectors 104 detect characteristics of the person associated with the artifacts 102. Examples of characteristics detectors 104 may include depression detector, anxiety detector, openness detector, extrovertness detector, and expertise detector. Other detectors may be utilized. The detectors 104 may employ one or more algorithms such as machine learning, rules, dictionary lookup, to discover the characteristics of the person from the artifacts. The characteristic detectors 104, e.g., may utilize a methodology described with reference to FIG. 3 below, to detect characteristics from the artifacts 102. For instance, the feature extractor 304, rules engine 308 and scoring mechanism 308 may detect characteristics. For instance, a simple depression detector applied to free text identifies keywords provided in a dictionary and disambiguates these keywords within the context of a sentence using rules.

A profile matcher component 110 matches the detected characteristics at 102 with those of one or more predefined propensity profiles 108. For example, each predefined propensity profile 108 specifies characteristics of a given propensity and one or more relationships between the specified characteristics. A predefined propensity profile 108 may also provide for timing attribute, for example, appearance of a characteristic at certain time point, e.g., in relation to another characteristic. The relationships between the characteristics may change over time.

A profile 108 may be represented as one or more of a set of longitudinal relations between propensity characteristics (relations between propensity characteristics over time), a set of rules satisfied within a specified time frame (e.g., for propensity X, an example rule may include, socialness score>0.9 and openness score>0.8 and extrovertness score>0.7 and depression score<0.3 and expertise score>0.6), a model (e.g., decision tree, Bayesian network) learned from annotated data, weighted multi-attribute utility model, and/or others.

A predefined propensity profile 108 may be manually configured, e.g., by a domain expert. In another aspect, a predefined propensity profile 108 may be automatically configured, e.g., using machine learning. A predefined propensity profile 108 may be updated, e.g., periodically, e.g., based on feedback and/or machine learning.

Latent characteristics 106 of the person, not detected from the artifacts 102, may be added to explore whether a matched composite propensity profile could develop. Thus, for instance, the profile matcher component 110 may also use latent characteristics 106 in addition to the characteristics detected at 104 to match with one or more of the predefined propensity profiles 108. Adding latent characteristics 106 injects another dimension into the matching process, and may provide for exploration of "what-if" type of analysis. An example of latent characteristic may be "fear of X," "fondness of Y," which when combined with the characteristics detected at 104 at given time or occurrence of an event, may trigger a propensity indication. For example, the artifacts may not lead the system to detect a "fear of authority figures", but such a characteristic with associated score can be added to the derived characteristics prior to matching against propensity profiles.

Based on the matching, one or more indicators 112 as to the propensity of the person may be output. Depending on the representation of the profile 108, the profile matcher 110 may use one or more of the following methods to produce an indicator for each target profile: Bayesian network prediction, rule-based prediction, decision-tree based prediction, multi-attribute decision theory, and/or other machine learning algorithms for prediction. For instance, considering a Bayesian network prediction as an example method, the Bayesian Network structure may be constructed based on any given propensity profile. The inputs to the Bayesian Network are the outputs of the multitude of detectors of characteristics 104 including their associated scores and any latent characteristics one chooses. Prior probability distributions of the characteristics can be, for instance, obtained from domain knowledge or learned from the artifacts.

In one aspect, a methodology of the present disclosure may accommodate any detector, for example, emotion detectors, behavioral patterns, communication patterns, level of expertise. The detectors identify the characteristics from the provided artifacts. An example of a behavioral pattern is the timing of logging in and logging off to a computer, the amount of data printed from a network drive or the type of files copied to a removable device. An example of communication pattern is the amount of e-mails exchanged with people inside or outside an organization. An example of level of expertise is a measurement of one's expertise in a topic area relative to others.

The detector methodology of the present disclosure may be provided as a service. In another aspect, the detector methodology may match composite profiles for individuals or for groups of people.

Figure 2:
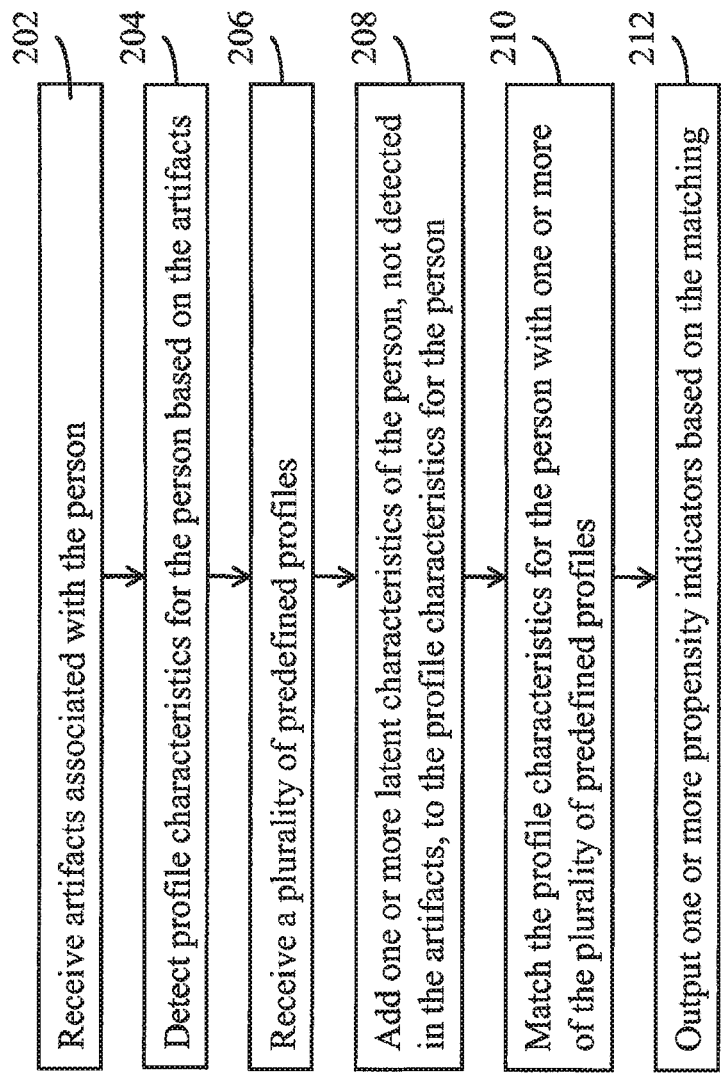
FIG. 2 is a flow diagram illustrating a method of the present disclosure in one embodiment.

FIG. 2 is a flow diagram illustrating a method of the present disclose in one embodiment. At 202, artifacts associated with the person are received. Artifacts may include email, instants messaging messages, web site content, social media content, and/or other electronic documents that the person for example authors.

At 204, profile characteristics for the person are detected from the artifacts. Different characteristic detectors may be used to detect different profile characteristics of the person.

At 206, a plurality of predefined profiles may be received. The plurality of predefined profiles may include a plurality of characteristics and relationships between the characteristics over time. Each of the plurality of predefined profiles specifies an indication of propensity. For instance, there may be a predefined profile for each different propensity.

At 208, optionally, one or more latent characteristics of the person, not identified in the artifacts by a profile detector, may be added to the profile characteristics for the person detected at 204.

At 210, the detected profile characteristics of the person, and optionally the latent characteristics, are matched with one or more of the plurality of predefined profiles. The matching may utilize one or more of the following techniques: Bayesian network prediction, rule-based prediction, decision-tree based prediction, multi-attribute decision theory, and/or other machine learning algorithms for prediction.

At 212, one or more propensity indicators are output based on the matching. The propensity indicators specify at least an expressed strength of a given propensity in the person at a given time.

In another aspect of the present disclosure, automatically discovering the state-of-mind (e.g., emotional) content in a given artifact, e.g., written text is provided. Written text refers to data or document that a user composes. Examples of written text include electronic communications such as emails, instant messaging, and any other text transcribed into electronic or digital form. A methodology in one embodiment may apply techniques from psycholinguistics that select words by an author reflective of inner, hidden state-of-mind, e.g., emotional state. A combination of lexical, semantic, and rule-based analytics may be used to identify the degree of expression across multiple state-of-mind dimensions, and the results may be fused to produce a judgment of risk, e.g., to identify risky content, e.g., those that should be further reviewed by a human investigator.

In one embodiment of the present disclosure a rule-based approach may be taken to detect categories of various state-of-mind, e.g., associated with malicious behavior.

Figure 3:
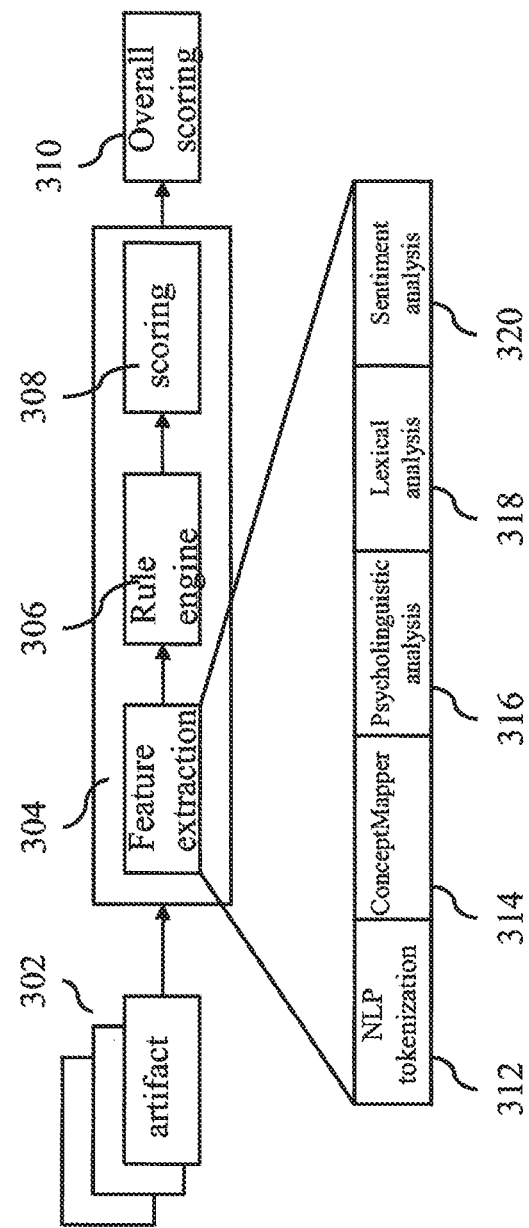
FIG. 3 illustrates components of system architecture pipeline for state-of-mind detection in one embodiment of the present disclosure.

FIG. 3 illustrates components of system architecture pipeline for a state-of-mind (e.g., emotion) detection in one embodiment of the present disclosure. A set of artifacts 302, e.g., electronic communication data such as emails, texting messaging, blogs and the like may be input.

A feature extraction component may extract a number of features from the artifact. Taking email as an example of artifact, features may be extracted from the body of the email, subject line, header information, and other parts of the email. The features may include lexical and semantic features related to emoticons, sentiment, and psycholinguistics, for instance, as described below.

Lexical Features

People often modify words to express their emotions or feelings in many different ways. Table 1 shows some widely used lexical expressions that indicate the strength of the underlying emotions in email messages.

TABLE 1

State-of-mind-bearing lexical features.

| Lexical Features | Examples |
| --- | --- |
| Uppercase words | THANK YOU, WHY |
| Repeated punctuation | !!!!, ??? |
| Repeated letters | soooo happy, thannnk you |

The feature extraction component 304 in one embodiment recognizes these expressions in the artifact, for instance, in lexical analysis 318. Repeated punctuation marks are detected using regular expressions. For words with repeating letters, it is checked whether a word contains three or more consecutive repeating characters. For each lexical feature, the number of occurrences in the artifact is used as the feature value.

Emoticons

Emoticons are pictorial representations of a facial expression using punctuation marks, numbers, and/or letters, used to express a person's feelings or mood. For example, email messages, including business emails, often contain emoticons. The use of emoticons indicates the author's explicit intention to express emotion. In the present disclosure in one embodiment, emoticon lexicons may be predefined and labeled, e.g., with two polarities (positive or negative). Examples of positive emoticons include, but are not limited to ":-)", ":-p"; Examples of negative emoticons may include, but are not limited to, ":-(", ":-<)". In one embodiment, counts of the number of positive emoticons and negative emoticons in the artifact are used as features.

Sentiment

The sentiments expressed in an artifact may indicate the presence and polarity of emotional content. In sentiment analysis 320 of the present disclosure in one embodiment, the numbers of positive and negative sentiment words are used as features indicating the sentiments expressed in an artifact. To detect the words with positive and negative polarity, the subjectivity lexicon may be used. This lexicon contains a list of words with a-priori polarity (positive, negative, both, and neutral) and the strength of the polarity (strong or weak). In one embodiment, only words of which prior polarity is either positive or negative and the strength of the polarity is strong may be used. A local context analysis may be performed to disambiguate the polarity of a sentiment word in the given context. If a sentiment word has a polarity shifter (e.g., "not" or "hardly") within a two-word window to the left, the polarity of the word is changed based on the shifter. For instance, if a positive sentiment word appears with a negation word, the polarity of word in the context becomes negative.

Semantics

Semantic meaning may be attached to words and phrases based on different methods: e.g., psycholinguistic analysis and ConceptMapper.

Psycholinguistic Analysis

Psycholinguistic analysis 316 is a technique used to analyze the emotional, cognitive, and topical properties of an artifact, e.g., written text. One of the common psycholinguistic techniques is Linguistic Inquiry and Word Count (LIWC). LIWC can be used in the analysis of texts such as emails, blogs, news articles, poems and speeches. LIWC can be used to capture psychometric properties of the author of an artifact. The LIWC dictionary groups words and word prefixes into classes ranging from functional words such as pronouns and first/second/third person references to words that express affect such as anger, anxiety, and sadness. LIWC's empirically-derived affect categories may be used for emotion classification task of the present disclosure in one embodiment.

ConceptMapper

ConceptMapper 314 is a dictionary-based semantic identification tool. User-specified attributes can be attached to words or phrases defined in a custom dictionary. Any number or type of attribute can be accommodated, such as semantic class (e.g. "apprehension" is a member of the Sem Anxiety semantic class), synonyms (e.g., the terms "anxiety," "foreboding," "cold sweat," and "intense sweat" are all synonyms) or part-of-speech tags (e.g., noun, verb, adverb). ConceptMapper 314 may contain algorithms that go beyond simple string matching to identify dictionary phrases contained in the text. For instance, in the sentence "John experienced an intense and cold sweat," ConceptMapper identifies two instances of the Sem Anxiety semantic class: "intense sweat" and "cold sweat."

Rule-Based Approach

In one embodiment of the present disclosure, a rule-based approach may be utilized to reliably identify specific state-of-minds within artifacts. In one embodiment, a set of artifacts with identified state-of-mind content may be used for creating a rule engine 306 and custom dictionaries. The rule engine 306 may have predicates that match words, concepts, and attributes, and allow conjunctions and disjunctions of these predicates. The rules in the rule engine 306 may combine terms that suggest an emotional state (e.g., angry, upset) with words that indicate the target of the emotional state (e.g., a subject word such as "I" followed by a connecting verb such as "feel" or "am"). As an example, for the emotion of anger, a rule may be <LIWC_I, LIWC_Anger, Sem_WorkNoun>. Based on the constructed rules and the extracted features, the rules engine may identify predefined categories of emotions in the given artifact 302. Examples of categories may include aggression, possessiveness/territoriality, anger, anxiety, disgruntlement, dehumanization, depression, ideological expression, victimization, entitlement.

Scoring Risk Emotions

For each of the risk state-of-minds, a score (e.g., at 108) may be computed for the degree to which the emotion is present in an artifact. An example method for computing the score may be as follows:

1. If there is no sentence that satisfies any of the rules in the emotional category or the artifact only contains the header and no body, then the score is zero.
2. Let $R_r$ be the ratio of number of sentences that satisfy the rules to the total number of sentences in the artifact. Define the rule score $S_r = R_r^{1/4}$.
3. Let $R_f$ be the ratio of number of lexical features to the total number of words in the artifact. Define the lexical feature score $S_f = R_f^{1/2}$.

The constants ¼ and ½ are used to boost the ratios $R_r$ and $R_f$ into scores $S_r$ and $S_f$, respectively. Because the rules have more context than the lexical features, the constant of $S_r$ (¼) is smaller than that of $S_f$ (½) so that $S_r$ is boosted more than $S_f$.

Overall Risk Judgment

At 310, an overall score for the artifact is computed. In one embodiment, the overall risk judgment of an artifact is a fusion of all the emotion scores. In one embodiment, the overall score may be computed as follows:

1. Divide the risk emotions into groups representing high, medium, and low risk, and assign a weight to each of these groups. An example of this categorization, is shown in Table 2. For example, aggression has a high risk level because its definition includes carrying out aggressive acts against specific people. Anger has a medium risk because it only concerns angry emotions not necessarily targeted against people. Denote $w_i$ as the weight for group i, where $i \in \{High, Medium, Low\}$ and $\Sigma_i w_i = 1$.
2. For each risk level group, let the average score within all state-of-mind scores in the group be $S_i$ and the number of state-of-minds which have score larger than 0.1 be $N_i$. The score of each risk level group $S_i$ is formulated as $S_i*(1+\alpha_i*N_i)$, where $\alpha_i$ is a boosting constant for this group. In this embodiment $S_i$ is the maximum score of a state-of-mind over all the relevant artifacts.
3. Compute the overall risk score $S_{risk} = \Sigma_i w_i * S_i$. The $w_i$ are empirically determined weights and the overall risk score is computed as the weighted average over all individual risk scores.

In judging whether a group of related artifacts (e.g., an email thread comprising a plurality of emails) contains a risk state-of-mind, each individual artifact in the group may be scored and the maximum score of an artifact may be used for the entire group. An artifact may be given a Yes label for a state-of-mind if the state-of-mind crosses an empirically determined threshold. The thresholds may be selected based on evaluation trial. A single artifact could contain more than one risk state-of-mind.

The system architecture shown in FIG. 1 may be based on Unstructured Information Management Architecture (UIMA) framework. UIMA enables developers to create and compose analytics for unstructured information sources. It is used for textual annotation tasks such as tokenization, part-of-speech tagging, shallow parsing, and language identification. UIMA's pipeline architecture allows individual analytic components to be chained together, creating a single composite analytic that performs complex behavior. UIMA provides a data structure called a CAS (Common Analysis Structure) that carries the content being analyzed (e.g., artifact such as the text of an email) and the annotations produced by each analytic in the pipeline. UIMA annotations specify a range of text that matches some criteria. For example, sentiment analytic of the present disclosure may examine the text "he is angry" and create an annotation for the word "angry" as occurring from position 6 to position 10 and having a polarity of "negative."

At a high level, a UIMA pipeline of the present disclosure may comprise parsing, tokenization, feature extraction, rule application, and scoring stages. A parsing stage in the pipeline may parse a group of assets into individual assets for scoring. The parsing stage may be bypassed if only one asset is being considered. Tokenization 312 is the process of identifying meaningful basic units of content for analysis such as words and sentences. Sentences provide a local context to disambiguate the semantics of words and phrases specified in one or more dictionaries of the present disclosure. A combination of dictionaries and rules may be used to provide word-level token annotations and sentence-level context annotations in a UIMA CAS. English language parser may be also used to refine context, distinguish between active and passive verbs, and identify subject-object-verb constructs. This information could directly be used by the rule engine 306 to provide a greater degree of granularity in the construction and matching of the rules.

Individuals in organizations use a tremendous amount of electronic communications, e.g., emails, often to the point of overload. The methodology of the present disclosure that automatically discovers emotional content in such artifacts, in another aspect, may allow for filtering of the artifacts from high volumes into smaller number of potentially high risk content for further processing.

By constructing longitudinal models of an individual's state-of-mind, malicious actions might become predictable and thus preventable. For example, recognizing when an individual suddenly experiences high levels of anxiety and disgruntlement can enable one to reach out to that individual to understand their feelings and provide help and assistance if necessary. Appropriate interventions may help deter malicious actions.

The method described above may use a combination of lexical sentiment, and semantic analysis to quantify the amount of emotional content in an artifact, e.g., electronic communication over any number of emotional dimensions. Emotions can be negative such as aggression, or emotions can be positive such as happiness. This method can be used on a single communication or over all communications for a given individual in order to develop a profile for the individual over multiple dimensions.

The state-of-mind detected in electronic communications, for example, as described above may be analyzed over a period of time to determine propensity of the author, e.g., possibly risky or threatening propensity.

Figure 4:
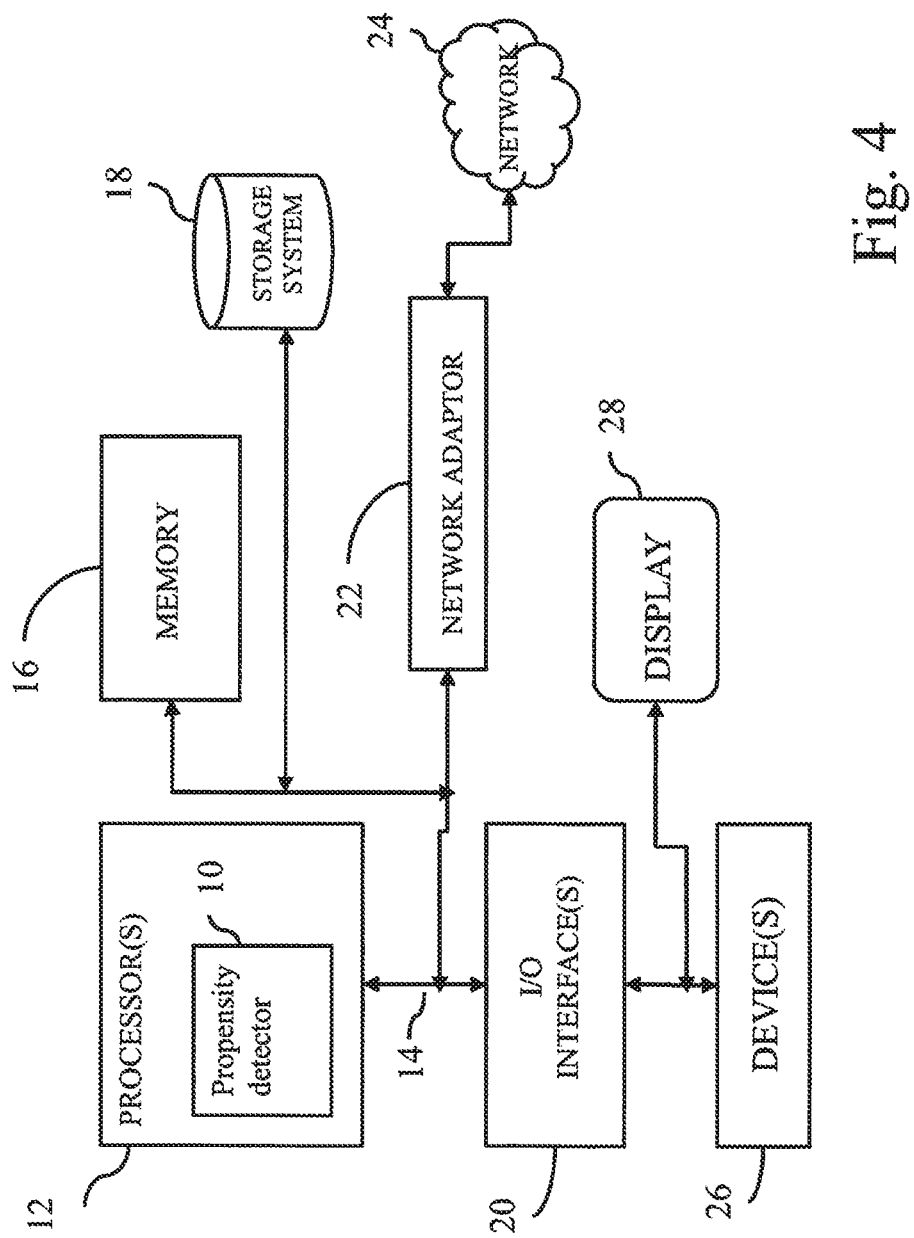
FIG. 4 illustrates a schematic of an example computer or processing system that may implement a propensity detection system in one embodiment of the present disclosure.

FIG. 4 illustrates a schematic of an example computer or processing system that may implement a propensity profile system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a propensity profile detector module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for detecting propensity profile of a person, comprising:

receiving artifacts associated with the person;

detecting, by one or more computer processors, profile characteristics for the person based on the artifacts, at least by tokenizing unstructured text data of the artifacts, part-of-speech tagging of the unstructured text data, and parsing the unstructured text data;

receiving a plurality of predefined profiles comprising a plurality of characteristics and relationships between the characteristics over time, each of the plurality of predefined profiles specifying an indication of propensity, wherein at least one of the plurality of predefined profiles includes a machine learning computer model learned based on annotated data, the computer model updated periodically based on feedback;

matching, by one or more of the computer processor, executing a machine learning algorithm, the profile characteristics for the person with one or more of the plurality of predefined profiles;

outputting one or more propensity indicators based on the matching, the propensity indicators comprising at least an expressed strength of a given propensity in the person at a given time; and adding one or more latent characteristics to the profile characteristics determined based on performing a what-if analysis, for detecting whether combining the one or more latent characteristics with the profile characteristics at the given time would trigger a propensity indication which would not be triggered by the profile characteristics.

2. The method of claim 1, wherein the artifacts comprise email, instant messaging messages, web site content, or social media content, or combinations thereof.

3. The method of claim 1, wherein the detecting profile characteristics comprises one or more of machine learning, detecting by a rule-based method, or detecting by dictionary lookup, or combinations thereof.

4. The method of claim 1, wherein the detecting profile characteristics comprises: extracting features from the artifacts;

applying rules based on a predefined dictionary to the extracted features to detect profile characteristics; and scoring the profile characteristics to determine a degree to which the profile characteristics are present in the artifacts.

5. The method of claim 4, wherein the extracting features from the artifacts comprises:

extracting lexical features comprising at least uppercase words, repeated punctuation, and repeated letters;

extracting emoticons;

extracting positive and negative sentiment words; and performing a sentiment analysis.

6. The method of claim 5, wherein the performing a sentiment analysis comprises:

performing psycholinguistic analysis; and a dictionary-based semantic identification.

7. A system for detecting propensity profile for a person, comprising:

a processor comprising at least hardware;

the processor configured to at least:

detect profile characteristics for the person based on a plurality of received artifacts, at least by tokenizing unstructured text data of the artifacts, part-of-speech tagging of the unstructured text data, and parsing the unstructured text data; and match by executing a machine learning algorithm, the profile characteristics for the person with one or more of a plurality of predefined profiles, the plurality of predefined profiles comprising a plurality of characteristics and relationships between the characteristics over time, each of the plurality of predefined profiles specifying an indication of propensity, wherein at least one of the plurality of predefined profiles includes a machine learning computer model learned based on annotated data, the computer model updated periodically based on feedback, the processor further configured to output one or more propensity indicators based on the matching, the propensity indicators comprising at least an expressed strength of a given propensity in the person at a given time, wherein one or more latent characteristics determined based on performing a what-if analysis is added to the profile characteristics, for detecting whether combining the one or more latent characteristics with the profile characteristics at the given time would trigger a propensity indication which would not be triggered by the profile characteristics.

8. The system of claim 7, wherein one or more latent characteristics are added to the profile characteristics for matching with the one or more of a plurality of predefined profiles.

9. The system of claim 7, wherein the artifacts comprise email, instant messaging messages, web site content, or social media content, or combinations thereof.

10. The system of claim 7, wherein the processor detects profile characteristics by one or more of machine learning, a rule-based method, or a dictionary lookup, or combinations thereof.

11. A computer program product comprising a computer readable storage medium having program instructions embodied therewith, wherein the computer readable storage medium is not a transitory signal per se, the program instructions readable by a processor to cause the processor to perform a method comprising:

receiving artifacts associated with the person;

detecting profile characteristics for the person based on the artifacts, at least by tokenizing unstructured text data of the artifacts, part-of-speech tagging of the unstructured text data, and parsing the unstructured text data;

receiving a plurality of predefined profiles comprising a plurality of characteristics and relationships between the characteristics over time, each of the plurality of predefined profiles specifying an indication of propensity, wherein at least one of the plurality of predefined profiles includes a machine learning computer model learned based on annotated data, the computer model updated periodically based on feedback;

matching by a machine learning algorithm, the profile characteristics for the person with one or more of the plurality of predefined profiles;

outputting one or more propensity indicators based on the matching, the propensity indicators comprising at least an expressed strength of a given propensity in the person at a given time; and adding one or more latent characteristics to the profile characteristics determined based on performing a what-if analysis, for detecting whether combining the one or more latent characteristics with the profile characteristics at the given time would trigger a propensity indication which would not be triggered by the profile characteristics.

12. The computer program product of claim 11, wherein the artifacts comprise email, instant messaging messages, web site content, or social media content, or combinations thereof.

13. The computer program product of claim 11, wherein the detecting profile characteristics comprises one or more of machine learning, detecting by a rule-based method, or detecting by dictionary lookup, or combinations thereof.

14. The computer program product of claim 11, wherein the detecting profile characteristics comprises:
   extracting features from the artifacts;
   applying rules based on a predefined dictionary to the extracted features to detect profile characteristics; and
   scoring the profile characteristics to determine a degree to which the profile characteristics are present in the artifacts.

15. The computer program product of claim 14, wherein the extracting features from the artifacts comprises:
   extracting lexical features comprising at least uppercase words, repeated punctuation, and repeated letters;
   extracting emoticons;
   extracting positive and negative sentiment words; and
   performing a sentiment analysis.

16. The computer program product of claim 15, wherein the performing a sentiment analysis comprises:
   performing psycholinguistic analysis; and
   a dictionary-based semantic identification.

17. The computer program product of claim 11, wherein at least some of the characteristics have time varying interdependencies among one another.

* * * * *